United States Patent [19]

Norton

[11] Patent Number: 4,676,896
[45] Date of Patent: Jun. 30, 1987

[54] FAUCET MOUNTED PURIFIER

[76] Inventor: William W. Norton, 51 Kings Cross Dr., Lincolnshire, Ill. 60015

[21] Appl. No.: 819,624

[22] Filed: Jan. 17, 1986

[51] Int. Cl.⁴ .............................................. C02F 1/32
[52] U.S. Cl. .................................... 210/192; 210/248; 422/24; 250/436; 250/437
[58] Field of Search ............... 422/24, 186.3; 210/192, 210/748, 243, 248, 251; 250/434–438

[56] References Cited

U.S. PATENT DOCUMENTS

| | | | |
|---|---|---|---|
| 1,193,143 | 8/1916 | Henri et al. | |
| 3,550,782 | 12/1970 | Veloz | 210/192 |
| 3,551,091 | 12/1970 | Veloz | 210/192 X |
| 3,700,406 | 10/1972 | Landry | 210/192 X |
| 3,767,918 | 10/1973 | Graybeal | 210/433 |
| 3,994,686 | 11/1976 | Rauser et al. | 422/24 X |
| 4,017,735 | 4/1977 | Siegel | 250/435 X |
| 4,033,719 | 7/1977 | Conn et al. | 250/435 X |
| 4,101,777 | 7/1978 | Reid | 250/436 |
| 4,141,686 | 2/1979 | Lewis | 422/24 X |
| 4,141,830 | 2/1979 | Last | 210/192 X |
| 4,214,962 | 7/1980 | Pincon | 422/24 X |
| 4,255,663 | 3/1981 | Lewis | 422/24 X |
| 4,267,455 | 5/1981 | Keller | 422/24 X |
| 4,274,970 | 6/1981 | Beitzel | 210/748 |
| 4,297,222 | 10/1981 | Takeguchi et al. | 210/748 |
| 4,322,291 | 3/1982 | Ho | 422/24 X |
| 4,326,954 | 4/1982 | Shroyer | 210/748 X |
| 4,342,915 | 8/1982 | Karamian | 422/24 X |
| 4,372,860 | 2/1983 | Kaas | 210/748 |
| 4,438,337 | 3/1984 | Forrat | 210/748 X |
| 4,456,512 | 6/1984 | Bieler et al. | 210/748 X |

Primary Examiner—Tom Wyse
Attorney, Agent, or Firm—George H. Gerstman

[57] ABSTRACT

A water purifier unit mounted on the outlet end of a faucet includes a housing defining an inlet port, a labyrinth flow passage, and an output port. The flow passage communicates between the inlet and outlet ports, with the housing carrying a wall formed of ultraviolet-transmissive material adjacent to the labyrinth flow passage. An ultraviolet radiation source is positioned to irradiate the labyrinth flow passage through the wall. In the illustrative embodiment, means are provided for mounting the unit with the inlet port directly connected to the outlet of the faucet.

8 Claims, 7 Drawing Figures

FAUCET MOUNTED PURIFIER

BACKGROUND OF THE INVENTION

The purification of water by means of ultraviolet radiation is well known. In a conventional installation, water may pass through a pre-filter and then a reverse osmosis module. Following this, the water passes through a carbon final filter, an ultraviolet irradiation unit, and then through some piping to a faucet.

While ultraviolet radiation is highly destructive to bacteria, it has been shown that under favorable circumstances, irradiated bacteria can repair themselves, given some time. Accordingly, water which has been irradiated with ultraviolet radiation may show no bacterial growth upon culturing immediately after irradiation, but later on the same water may exhibit positive results on bacteria culturing. This particularly take place by a process known as photo-reactivation, in which the bacteria are able to regain the capability to multiply in the presence of visible spectrum light.

Accordingly, even in a system such as that described above in which water passes through an ultraviolet irradiator, if the faucet is not used to draw water continuously, bacteria can revive in the portion of piping which is downstream from the irradiator, so that stagnant water in the piping downstream from the irradiator can once again become contaminated with growing bacteria, without any extra bacteria being innoculated into the stagnant water held in the faucet.

By this invention, a final ultraviolet irradiation step of very high efficiency can be provided to a faucet which carries the unit of this invention, preferably in such a manner that water cannot be stored after ultraviolet irradiation. To accomplish this, the ultraviolet unit of this invention may be designed to be at the exact end of the water flow path.

The Galtek Corporation of Chaska, Minn. discloses an ultraviolet sterilizing system in which the faucet itself through which water flows is sterilized, particularly between uses, to prevent bacteria from migrating upwardly into the faucet back toward the water source. The prime purpose of the Galtek structure is to sterilize the spout or faucet end, rather than to sterilize water passing through the faucet.

By the present invention, an ultraviolet sterilizer unit is provided, which exhibits improved efficiency for sterilizing of water, and which may be mounted on the end of the faucet to minimize or eliminate the chance that residual water which has been ultraviolet irradiated will become stagnant and reinfected with growing bacteria. The unit of this invention may be activated by turning on the faucet and deactivated by turning the faucet off, but time delay devices and the like may be provided as desired to keep the unit operating for a period of time after shut-off of the faucet.

DESCRIPTION OF THE INVENTION

In this invention a water purification device is provided which comprises a housing defining an inlet port, a labyrinth flow passage, and an outlet port, where the flow passage communicates between the inlet and outlet ports. The housing includes ultraviolet-transmissive means adjacent to the labyrinth flow passage.

An ultraviolet radiation source is positioned to irradiate the labyrinth flow passage through the ultraviolet-transmissive means. In the illustrative embodiment, means are provided for coupling the inlet port of the unit to an outlet of a faucet.

Accordingly, as the faucet is turned on, water enters the unit and passes through the labyrinth flow passage, for significantly increased exposure times to ultraviolet radiation from the ultraviolet radiation source, which is positioned to irradiate the labyrinth flow passage through the ultraviolet-transmissive means. The ultraviolet-transmissive means may comprise a wall made of quartz, for example, or any other desired ultraviolet-transmissive material. The wall is exposed to the labyrinth flow passage which flows in a convoluted manner along the inner surface of the ultraviolet-transmissive wall, so that individual portions of the water are exposed for an increased amount of time to ultraviolet radiation as they pass through the labyrinth.

Since the unit of the present invention is mounted in direct communication with an outlet of a faucet and the outlet port may be immediately downstream from the labyrinth passage, no significant place may be provided for water to be retained and to grow stagnant, giving bacteria an opportunity to regain their capability of multiplying again following ultraviolet irradiation.

It is generally preferred for drain hole means to be provided to the labyrinth flow passage, so that when the faucet is shut off, water drains from the passage to further eliminate the possibility of bacterial regrowth in stagnant water. In an embodiment in which drain hole means are provided, the unit may be mounted at the base of the faucet instead of at the faucet outlet, if desired.

The ultraviolet radiation source may preferably be a cylindrical ultraviolet bulb backed by a parabolic reflector. The bulb and reflector are positioned to provide ultraviolet radiation which mostly passes through the ultraviolet-transmissive wall at substantially right angles thereto. Thus, angular refraction of the ultraviolet radiation is avoided, increasing the percentage of ultraviolet radiation which passes into the labyrinth, for more efficient bacteriostatic effect.

As another advantage, the means for powering and operating the ultraviolet bulb used in the unit of this invention may be positioned remotely from the bulb and connected with an insulated wire, so that the unit which is carried on the faucet may be small. The bulb powering means, including typically a transformer and ballast, may be placed underneath the sink with which the faucet is associated, for example.

Furthermore, a switch may be present to energize the ultraviolet bulb when the faucet is turned on and to turn the bulb off when the faucet is turned off. Any desired timer device may be used to delay switch shut off for a predetermined period of time after the faucet is turned off. Additionally, another timer may periodically cause the ultraviolet bulb to be energized for regular, intermittent irradiation of the flow path for those times in which the faucet is not in active use.

The plane of the ultraviolet-transmissive wall may be generally parallel to an axial line extending between the inlet and outlet ports. The cylindrical ultraviolet bulb, backed by the parabolic reflector, may also be positioned in parallel relation to the wall to cause ultraviolet radiation to pass through the wall into the labyrinth.

Accordingly, an improved, faucet-mounted ultraviolet sterilization unit is provided.

DESCRIPTION OF SPECIFIC EMBODIMENT

Figure 1:
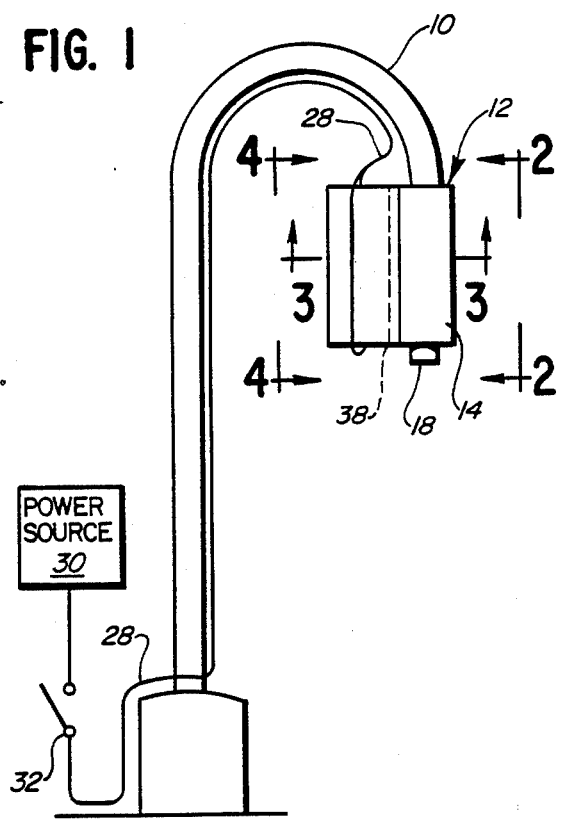
FIG. 1 is an elevational view, taken partly schematically, of a faucet, with the water purification unit of this invention attached.

Referring to the drawings, a water purification unit in accordance with this invention is disclosed. Faucet 10 carries on its outer end purification unit 12, either in permanent manner as shown where the unit is part of the faucet, or by means of an attachment means such as a threaded nut or the like, so that the unit may be attached to conventional faucets which are already installed.

Figure 2:
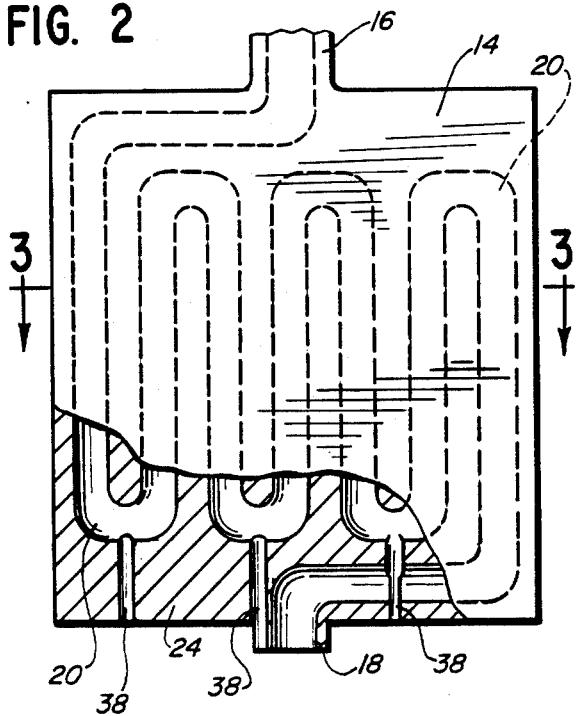
FIG. 2 is an elevational view taken along line 2—2 of FIG. 1.
Figure 4:
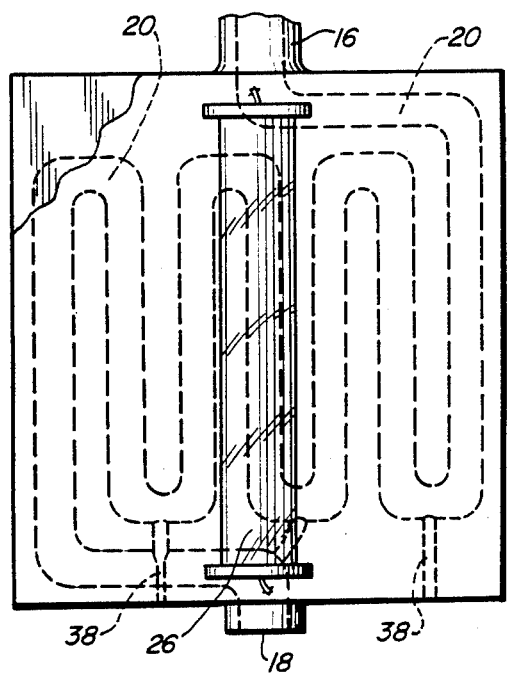
FIG. 4 is an elevational view taken along line 4—4 of FIG. 1.

As shown particularly in FIG. 2, housing 14 defines inlet port 16, outlet portion 18, and labyrinth flow passage 20, which may be a serpentine or otherwise convoluted passage to increase the length of the flow path exposed to ultraviolet radiation. Labyrinth flow passage 20 communicates between inlet 16 and outlet 18.

Figure 3:
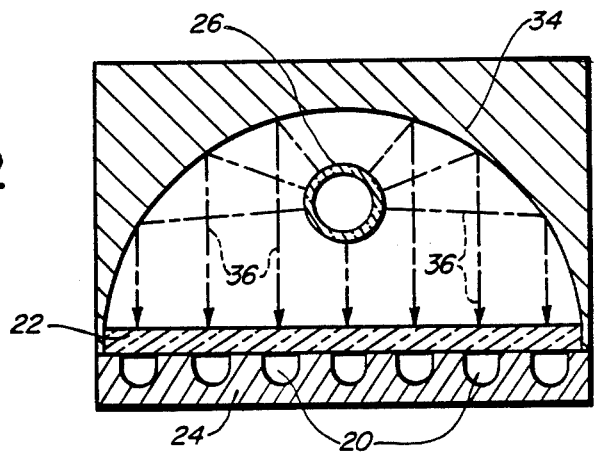
FIG. 3 is a longitudinal sectional view taken along line 3—3 of FIG. 1.

Housing 14 also carries wall 22, which may be made of quartz or any other appropriate ultraviolet transparent material. Quartz wall 22 may cooperate with grooved wall 24, with the two members being sealed together as shown in FIG. 3 to define the enclosed labyrinth 20.

Cylindrical ultraviolet bulb 26 is provided, being connected by wire 28 to a power source 30, which typically may include a transformer and ballast in conventional manner. The system is controlled by switch 32, with switch 32 being connected if desired to the handle or other control that permits water to flow through faucet 10. Thus, when water is flowing through faucet 10, switch 32 is closed so that ultraviolet tube or bulb 26 is irradiating the water as it flows through labyrinth 20. When the faucet is shut off, switch 32 may shut off ultraviolet bulb 26, or, if desired, a timer may be provided so that the ultraviolet tube delays its shut off for a predetermined length of time following shut off of flow through the faucet.

Ultraviolet bulb 26 may be backed by a parabolic reflector 34 that extends the length of cylindrical ultraviolet bulb 26. Accordingly, light that is emitted from bulb 26 may be reflected off of parabolic reflector 34, to travel in paths indicated by arrows 36 to pass through wall 22 in substantially perpendicular manner, for improved efficiency of ultraviolet irradiation of labyrinth 20. This can be accomplished by placing ultraviolet bulb 26 at the focus of parabolic (or elliptical) reflector 34 as shown.

It is typically deemed desirable to drain labyrinth 20 in between uses, so as to avoid the creation of a stagnant water area where irradiated water may rest, with the possibility that bacteria will begin to multiply again. To effect this, drain holes 38 may be provided at positions slightly spaced from outlet port 18 for each convolution of labyrinth 20. Accordingly, after use, when the faucet 10 is shut off, labyrinth 20 may be drained by water flowing out of drain holes 38, to eliminate the stagnant water problem.

The surfaces in which water flows in labyrinth 20 may be coated with a hydrophobic agent such as polytetrafluoroethylene to facilitate the draining of as much water as possible out of labyrinth 20 between uses. Also, the water-contacting walls of labyrinth 20 as formed in plate 24 may be canted to increase the intensity of ultraviolet radiation on them, since most of the ultraviolet radiation is approaching walls 22, 24 in substantially perpendicular relation to them.

As an alternative, a spherical source of ultraviolet radiation may be mounted over a circular labyrinth and backed by a reflector.

Figure 5:
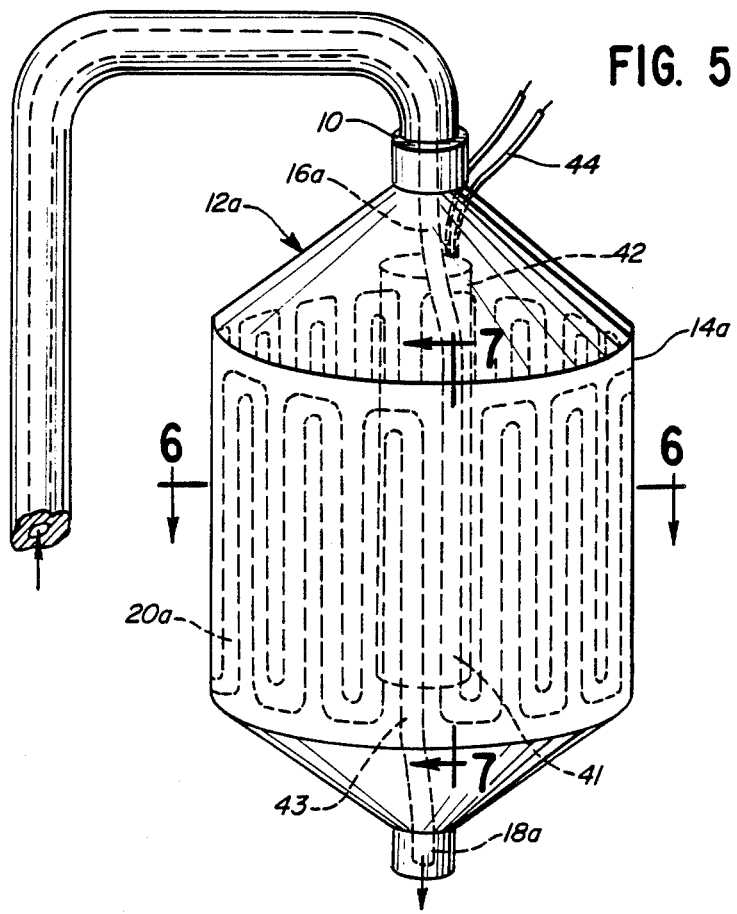
FIG. 5 is an elevational view of another embodiment of a faucet, with the water purification unit in this invention attached.
Figure 7:
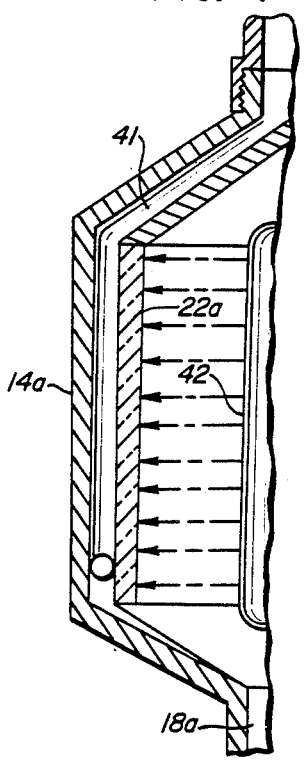
FIG. 7 is a reduced size partial, longitudinal sectional view of the structure of FIG. 5, rotated 90° about its longitudinal axis.
Figure 6:
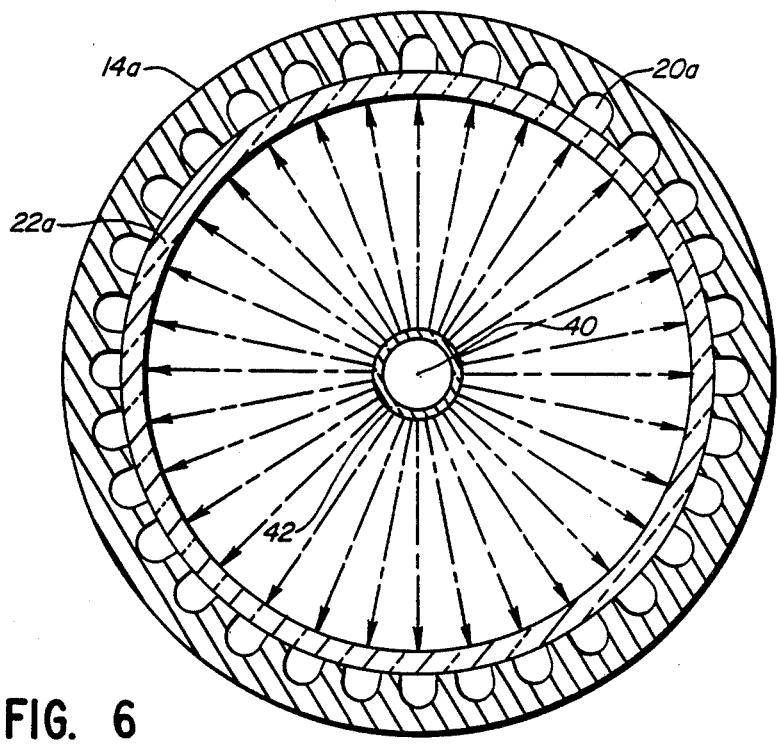
FIG. 6 is a transverse sectional view taken along line 6—6 of FIG. 5.

Referring to FIGS. 5 through 7, another embodiment of the invention of this application is shown. Faucet 10 in this instance carries on its outer end a purification unit 12a which includes housing 14a defining inlet port 16a, outlet port 18a, and labyrinth flow passage 20a. In this instance, housing 14a provides a labyrinth flow passage 20a which is arranged in a cylindrical configuration as shown about the axis 40 of housing 14a, with inlet port 16a and outlet port 18a being connected to adjacent lengths 41, 43 of the convoluted or serpentine labyrinth flow passage 20a. Accordingly, liquid in the flow passage follows the serpentine path around the cylindrical plane as shown.

Within housing 14a is a cylindrical wall 22a of ultraviolet transparent materials, for example, quartz. Within that, typically positioned in coaxial relation with central axis 40, is a cylindrical ultraviolet bulb 42 which may irradiate most of the length of labyrinth flow passage 20a, for extended irradiation of fluids passing therethrough. As with the FIG. 2 embodiment, the FIGS. 5-7 embodiment may include drain holes defined by labyrinth flow passage 20a to eliminate a stagnant water problem.

Connection wires 44 for the ultraviolet bulb 42 may pass out of housing 14a as shown in FIG. 5, and be connected to a ballast and power system in a manner analogous to the device of FIG. 1.

Alternatively, ultraviolet transparent wall 22a may be the outer jacket of a cylindrical ultraviolet bulb, if desired.

Accordingly, the invention of this application provides a ultraviolet irradiation system which is carried on the end of a faucet, making use of a labyrinth system and a ultraviolet bulb with reflector to provide greater irradiation of fluids passing through the labyrinth. The risk of reactivation of bacteria which have been previously irradiated is greatly reduced, when compared with conventional systems, by the invention of this application.

The above has been offered for illustrative purposes only, and is not intended to limit the scope of the invention, which is as defined in the claims below.

That which is claimed is:

1. A water purification unit, which comprises:
   a housing defining an inlet port and an outlet port;
   said housing including ultraviolet-transmissive means, a flow passage between said inlet port and said outlet port;
   an ultraviolet radiation source positioned to irradiate said flow passage through said ultraviolet transmission means;

said flow passage being configured to require the water to flow by said ultraviolet radiation source at least twice to enhance the ultraviolet irradiation of the water;

a faucet having a distal outlet end thereof connected to said inlet port so that there is no significant place downstream of said housing outlet port for water to be retained and to grow stagnant; and means other than said outlet port for draining said flow path when the faucet is off.

2. The unit of claim 1 in which said ultraviolet radiation source is a cylindrical ultraviolet tube backed by a parabolic reflector, said bulb and reflector being positioned to provide ultraviolet radiation which mostly passes through said ultraviolet-transmissive means at substantially right angles thereto.

3. The unit of claim 2 including electrical power means for operating said ultraviolet tube connected thereto.

4. The unit of claim 3 in which a switch is present to energize said ultraviolet tube when said faucet is turned on.

5. The unit of claim 3 in which said electrical power means includes a remotely located transformer, whereby the unit which is carried on a faucet may be small.

6. The unit of claim 1 in which said ultraviolet radiation source is a cylindrical ultraviolet tube backed by a parabolic reflector, said bulb and reflector being positioned to provide ultraviolet radiation which mostly passes through said ultraviolet-transmissive means at substantially right angles thereto.

7. A water purification unit which comprises:

a housing which defines an inlet port;

said housing also defining an outlet port, a labyrinth passage communicating between said inlet and outlet ports, and a wall formed of ultraviolet-transmissive material;

a cylindrical ultraviolet tube backed by a parabolic reflector;

said cylindrical tube being positioned in parallel relation to said wall in a position to cause ultraviolet radiation to pass through said wall into said labyrinth passage;

said parabolic reflector being positioned to direct reflected ultraviolet radiation through said wall into said labyrinth passage at substantially right angles thereto;

power means for energizing said ultraviolet tube;

a faucet having a distal outlet end thereof connected to said inlet port so that there is no significant place downstream of said housing outlet port for water to be retained and to grow stagnant; and means other than said outlet port for draining said labyrinth passage when the faucet is off;

said power means being positioned remotely from said bulb and faucet;

electric wire connecting said power means and bulb; and switch means for activating said power means.

8. The unit of claim 7 in which said switch means is adapted to energize said ultraviolet tube when the faucet is turned on.

* * * * *